US012769125B2

(12) United States Patent
Lowney et al.

(10) Patent No.: US 12,769,125 B2
(45) Date of Patent: Oct. 20, 2026

(54) HEAD-WORN DISPLAY INCLUDING AN OPTICAL PATH FOR SPLIT OPTICAL POWER APPLICATION

(71) Applicant: GOOGLE LLC, Mountain View, CA (US)

(72) Inventors: Joseph Daniel Lowney, Tucson, AZ (US); Ido Raveh, Waterloo (CA)

(73) Assignee: GOOGLE LLC, Mountain View, CA (US)

( * ) Notice: Subject to any disclaimer, the term of this patent is extended or adjusted under 35 U.S.C. 154(b) by 6 days.

(21) Appl. No.: 18/435,662

(22) Filed: Feb. 7, 2024

(65) Prior Publication Data

US 2025/0251597 A1 Aug. 7, 2025

(51) Int. Cl.

*G02B 27/01* (2006.01)
*F21V 8/00* (2006.01)
*G02B 27/00* (2006.01)
*G02B 27/09* (2006.01)

(52) U.S. Cl.

CPC ....... *G02B 27/0172* (2013.01); *G02B 6/0016* (2013.01); *G02B 6/0036* (2013.01); *G02B 27/0081* (2013.01); *G02B 27/0955* (2013.01); *G02B 2027/0178* (2013.01)

(58) Field of Classification Search

CPC ......................... G02B 27/0172; G02B 6/0016; G02B 6/0036; G02B 27/0081; G02B 27/0955; G02B 2027/0178

See application file for complete search history.

(56) References Cited

U.S. PATENT DOCUMENTS

| | | | | |
|---|---|---|---|---|
| 10,156,722 B2 | 12/2018 | Gao et al. | | |
| 11,448,815 B2 * | 9/2022 | Koshelev | ........... | G02B 6/29331 |
| 11,698,538 B2 * | 7/2023 | Wheelwright | ..... | G02B 26/0833 359/199.1 |
| 2015/0205127 A1 * | 7/2015 | Border | ................. | G02B 27/283 359/630 |
| 2015/0205130 A1 * | 7/2015 | Border | ................. | G02B 27/144 359/630 |
| 2015/0205131 A1 * | 7/2015 | Border | ............... | G02B 26/0833 359/630 |
| 2015/0277120 A1 * | 10/2015 | Border | ............... | G02B 26/0833 345/8 |

(Continued)

OTHER PUBLICATIONS

Kohno, T. et al., “Display Leakage and Transparent Wearable Displays: Investigation of Risk, Root Causes, and Defenses”, Feb. 1, 2015, downloaded from <<https://www.semanticscholar.org/paper/Display-Leakage-and-Transparent-Wearable-Displays%3A-Kohno-Kollin/8699f41446304c3b7466cb77ad085c62da7bd11e>>; 15 pages.

*Primary Examiner* — Sejoon Ahn

(57) ABSTRACT

A head-worn display (HWD) is configured to present an extended reality (XR) image to a user at a predetermined finite distance. To this end, the HWD includes an optical path having a first component configured to apply a first optical power to light representing the XR image emitted from a light engine. Further, the optical path includes a second component, different from the first component, configured to apply a second optical power to the light having the first optical power applied. Additionally, the optical path is configured to present the light having the first and second optical powers applied to the user such that the XP image is presented to the user at a finite distances based on the first and second optical powers.

20 Claims, 7 Drawing Sheets

(56) References Cited

U.S. PATENT DOCUMENTS

| | | | | |
|---|---|---|---|---|
| 2016/0018649 | A1* | 1/2016 | Osterhout | G02B 27/0101 359/630 |
| 2017/0315356 | A1* | 11/2017 | Tervo | G02B 27/0176 |
| 2019/0212557 | A1* | 7/2019 | Waldern | G02B 27/0101 |
| 2019/0212699 | A1* | 7/2019 | Waldern | G03H 1/202 |
| 2020/0096772 | A1* | 3/2020 | Adema | G02B 6/0016 |
| 2020/0132919 | A1* | 4/2020 | Cakmakci | G02B 27/0172 |
| 2020/0301239 | A1* | 9/2020 | Akkaya | G02B 27/0172 |
| 2020/0386947 | A1* | 12/2020 | Waldern | G02B 27/0103 |
| 2020/0409145 | A1* | 12/2020 | Bablumyan | G02B 27/0081 |
| 2021/0003848 | A1* | 1/2021 | Choi | G02B 3/0081 |
| 2021/0141130 | A1* | 5/2021 | Lee | G02B 27/1006 |
| 2022/0091560 | A1* | 3/2022 | Jang | G03H 1/2286 |
| 2022/0099977 | A1 | 3/2022 | Meitav et al. | |
| 2022/0146740 | A1* | 5/2022 | Koshelev | G02B 6/29331 |
| 2022/0268970 | A1* | 8/2022 | Cranton | G02B 27/0081 |
| 2023/0071329 | A1 | 3/2023 | Wu et al. | |
| 2023/0108721 | A1 | 4/2023 | Yeoh et al. | |
| 2023/0194870 | A1* | 6/2023 | Lowney | G02B 27/0172 385/37 |
| 2023/0194871 | A1 | 6/2023 | Lowney | |
| 2023/0393322 | A1* | 12/2023 | Feng | G02B 5/32 |

* cited by examiner

HEAD-WORN DISPLAY INCLUDING AN OPTICAL PATH FOR SPLIT OPTICAL POWER APPLICATION

BACKGROUND

Lightguides, such as those used in head-worn displays (HWDs), are commonly configured to direct light representative of an image from a projector to the eye of a user such that the image is viewable to the user in a real-world space. To this end, some lightguides include an incoupler and an outcoupler each having sets of diffractive or reflective structures that are configured to direct light based on various parameters. As an example, within some lightguides, the incoupler of a lightguide is configured to first receive light representing an image emitted from a projector. This incoupler includes a set of structures configured to direct the light into the main body of the lightguide such that the light propagates through the body of the lightguide toward an outcoupler of the lightguide. The outcoupler includes another set of structures that is configured to direct the received light out of the lightguide and toward the eyes of a user. The light directed by the outcoupler then forms an exit pupil near the eyes of the user, allowing the user to view the image represented by the light in a real-world space.

However, when the projector provides collimated light representing the image to the lightguide, the resulting image provided to the user is presented at an infinite distance. Because the image is presented to the user at an infinite distance, the user's eyes must continually change focus between the image presented at an infinite distance and the real-world space near the user. This switching of focus between the image and the real world increases the likelihood that the user experiences eye fatigue, headaches, and nausea, diminishing the user's enjoyment of the HWD and negatively impacting user experience.

BRIEF DESCRIPTION OF THE DRAWINGS

The present disclosure may be better understood, and its numerous features and advantages are made apparent to those skilled in the art by referencing the accompanying drawings. The use of the same reference symbols in different drawings indicates similar or identical items.

DETAILED DESCRIPTION

Figure 1:
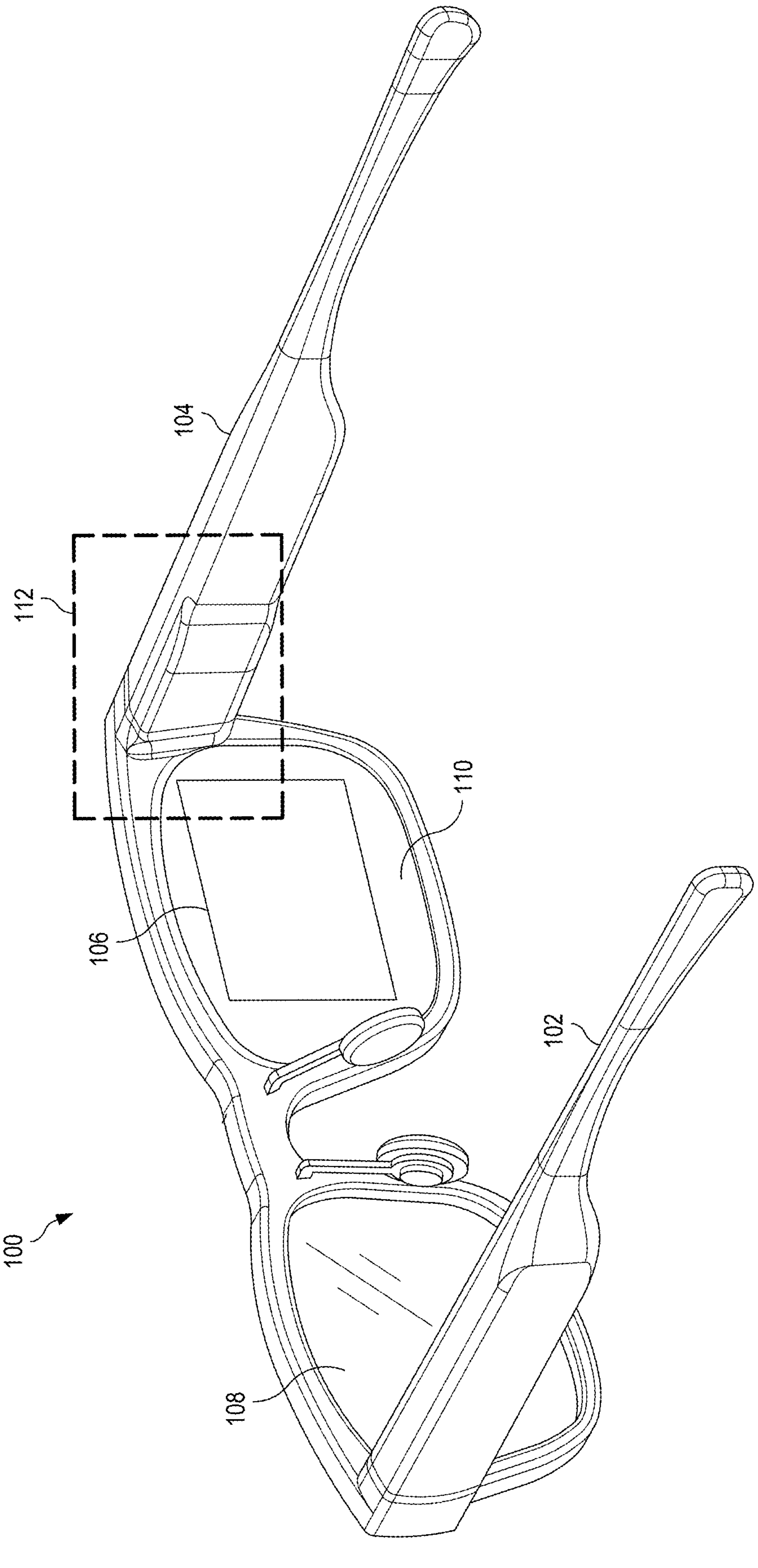
FIG. 1 is a diagram of an example display system housing a projection system configured to present images to the eye of a user at a predetermined finite distance, in accordance with some embodiments.

Systems and techniques herein are directed to head-worn displays (HWDs) (e.g., extended reality HWDs) configured to direct light toward the eyes of a user such that one or more extended reality (XR) images are presented to the user. For example, a HWD has a form resembling eyeglasses and includes one or more lenses containing a lightguide to direct light representative of an image to the eye of the user. Herein, the combination of the lens and lightguide is referred to as an "optical combiner," "optical combiner lens," or both. Such a lightguide, for example, includes one or more incouplers, exit pupil expanders (EPEs), and outcouplers configured to direct light representing an XR image from a projector to the eye of the user. As an example, the lightguide includes an incoupler configured to receive light representing an XR image emitted from a light engine and direct the received light into the lightguide such that the light propagates through the lightguide using total internal reflection (TIR), partial internal reflection (PIR), or both. The light then propagates through the lightguide until the light is received at an outcoupler of the lightguide. In response to receiving the light, the outcoupler directs the light out of the lightguide and towards the eye of the user such that the light forms an exit pupil representative of the XR image near the eye of the user. This exit pupil, for example, represents the location along the optical path where the beams of the light, as directed by the lightguide, intersect. Further, some lightguides include an exit pupil expander (EPE) configured to receive light from the incoupler and direct light towards the outcoupler. Such an EPE, for example, is further configured to direct the light toward the outcoupler such that the size of the exit pupil is increased (e.g., the exit pupil is expanded).

When such an XR image is presented to the user in this way, the XR image appears within the real-world environment viewable by the user through the HWD. However, certain arrangements within the HWD cause the image to be presented at an infinite distance (e.g., focused at an infinite distance). For example, an HWD including a light engine configured to provide collimated light representative of an XR image provides the collimated light to a lightguide. The lightguide then directs the collimated light into the lightguide via, for example, an incoupler and propagates the collimated light toward an outcoupler. The outcoupler then directs the collimated light out of the lightguide so as to form an exit pupil near the eye of the user representing the image. Due to the light provided by the light engine and the propagating through the lightguide being collimated, the XR image presented to the user is presented at an infinite distance (e.g., focused at an infinite distance). Presenting the XR image at an infinite distance, though, causes eye strain on the user and negatively impacts user experience. For example, because the XR image is presented at an infinite distance within a real-world environment, an unnatural setting is produced that requires a user's eyes to switch between focusing on the XR image at an infinite distance and the real world at a finite distance. This switching between the XR image at the infinite distance and the real world at a finite, for example, indices eye fatigue, headaches, nausea, or any combination thereof and causes the user to become uncomfortable.

To help prevent the user from having to switch between focusing on the XR image at an infinite distance and the real world at a finite distance, systems and techniques disclosed here are directed to presenting the XR image provided by a lightguide at a predetermined finite distance. To this end, an HMD includes an optical path that includes two or more components (e.g., light engine, lightguide, lenses, relays, scan mirrors) together configured to provide light representative of an XR image to a user at a predetermined optical power. For example, an HMD includes an optical path having at least a light engine configured to provide light representative of an XR image and an optical combiner that is configured to direct the light from the light engine to the eye of a user. Within this optical path, a first component (e.g., a light engine) is configured to apply a first amount of optical power to the light from the light engine and a second component (e.g., a lightguide), different from the first component, is configured to apply a second amount of optical power to the light having the first optical power applied such that light provided to the user has the first and second optical powers applied to it. Due to the components of the optical path applying the first optical power the second optical power in this way, the XR image represented by the light from the light engine is presented to the user at a distance based on a sum of the first optical power and the second optical power. As an example, in some arrangements, an HWD includes a light engine (e.g., a first component) that is defocused such that the light engine provides light with a first optical power to the lightguide. Further, the HWD includes a single-layer lightguide (e.g., a second component) that includes an element (e.g., incoupler, EPE, outcoupler) configured to apply a second optical power to the light provided from the light engine as it propagates through the lightguide. As such, due to the light engine applying a first optical power to the light and the lightguide applying a second optical power to the light, the light directed out of the lightguide toward the eye of the user presents an XR image at a finite distance based on a sum of the first and second optical powers.

In this way, the HWD is configured to provide an XR image at a finite distance, allowing a user to switch focus between the XR image at the predetermined distance and the real-world at a similar distance which helps to reduce eye fatigue, headaches, nausea, or any combination thereof for the user. Additionally, because the optical powers are introduced into the optical path without additional components, such as a push-and-pull lens combination or additional layers to the lightguide, such additional components do not add to the thickness or weight of the HWD, helping the HWD to have a slimmer and lighter profile. Further, because the application of optical power is split between two or more components rather than a single component, the XR image is presented to the user at a finite distance without reducing the quality of the image. For example, defocusing the light engine to provide both the first and second optical powers (e.g., a sum of the first and second optical powers) increases the likelihood that the lightguide (e.g., via pupil replication) noticeably degrades the XR image presented to the user. However, splitting the between two or more components of the optical path reduces the optical power that the light engine needs to apply, helping to decrease the likelihood that the lightguide noticeably degrades the XR image presented to the user.

FIG. 1 illustrates an example display system 100 configured to display an XR image to a user at a predetermined distance, in accordance with embodiments. In embodiments, the display system 100 includes a support structure 102 having an arm 104, which houses a projection system configured to project XR images toward the eye of a user such that the user perceives the projected XR images as being displayed in a field of view (FOV) area 106 of a display at one or both of lens elements 108, 110. In the depicted embodiment, the display system 100 is an eyewear display that includes a support structure 102 configured to be worn on the head of a user and has a general shape and appearance of an eyeglasses (e.g., sunglasses) frame. The support structure 102 contains or otherwise includes various components to facilitate the projection of such images toward the eye of the user, such as a projector, an optical scanner, and a lightguide. In some embodiments, the support structure 102 further includes various sensors, such as one or more front-facing cameras, rear-facing cameras, other light sensors, motion sensors, accelerometers, and the like. The support structure 102 further can include one or more radio frequency (RF) interfaces or other wireless interfaces, such as a Bluetooth™ interface, a Wi-Fi interface, and the like. Further, in some embodiments, the support structure 102 further includes one or more batteries or other portable power sources for supplying power to the electrical components of the display system 100. In some embodiments, some or all of these components of the display system 100 are fully or partially contained within an inner volume of support structure 102, such as within the arm 104 in region 112 of the support structure 102. It should be noted that while an example form factor is depicted, it will be appreciated that in other embodiments the display system 100 may have a different shape and appearance from the eyeglasses frame depicted in FIG. 1.

One or both of the lens elements 108, 110 are used by the display system 100 to provide an XR display in which rendered graphical content can be superimposed over or otherwise provided in conjunction with a real-world view as perceived by the user through the lens elements 108, 110. For example, light used to form a perceptible XR image or series of XR images may be projected by a projection system of the display system 100 onto the eye of the user via a series of optical path components, such as a single-layer lightguide formed at least partially in the corresponding lens element, one or more scan mirrors, one or more optical relays, one or more lenses (e.g., push lenses, pull lenses, curved lenses), or any combination thereof. In embodiments, one or both of the lens elements 108, 110 include at least a portion of a lightguide that routes display light received by an incoupler of the lightguide to an outcoupler of the lightguide, which outputs the display light toward an eye of a user of the display system 100. The display light is modulated and scanned onto the eye of the user such that the user perceives the display light as an image. In addition, each of the lens elements 108, 110 is sufficiently transparent to allow a user to see through the lens elements to provide a field of view of the user's real-world environment such that the XR image appears superimposed over at least a portion of the real-world environment.

In some embodiments, the projection system is a digital light processing-based projector, a microdisplay, a scanning laser projector, or any combination of a modulative light source such as a laser or one or more LEDs and a dynamic reflector mechanism such as one or more dynamic scanners or digital light processors. In some embodiments, the projection system includes multiple laser diodes (e.g., a red laser diode, a green laser diode, and/or a blue laser diode) and at least one scan mirror (e.g., two one-dimensional scan mirrors, which may be micro-electromechanical system (MEMS)-based or piezo-based). The projection system is communicatively coupled to the controller and a non-transitory processor-readable storage medium or memory storing processor-executable instructions and other data that, when executed by the controller, cause the controller to control the operation of the light engine. In some embodiments, the controller controls a scan area size and scan area location for the light engine and is communicatively coupled to a processor (not shown) that generates content to be displayed at the display system 100. The projection system scans light over a variable area, designated the FOV area 106, of the display system 100. The scan area size corresponds to the size of the FOV area 106 and the scan area location corresponds to a region of one of the lens elements 108, 110 at which the FOV area 106 is visible to the user. Generally, it is desirable for a display to have a wide FOV to accommodate the outcoupling of light across a wide range of angles. Herein, the range of different user eye positions that will be able to see the display is referred to as the eyebox of the display.

In some embodiments, the display system 100 is configured to present an XR image to the user at a predetermined finite distance from the display system 100 (e.g., from the user). For example, in embodiments, the display system 100 includes an optical path including two or more components configured to provide light representative of one or more XR images to a user. Such components, include, for example, a light engine (e.g., within a projection system), scan mirrors, lightguides, lenses, or any combination thereof together configured to provide light representative of an XR image from the light engine to the eye of a user. According to embodiments, a first component (e.g., the light engine) of the optical path is configured to apply a first optical power to the light representative of the XR image. As an example, the light engine is configured to defocus the light representative of the XR image such that the light is uncollimated and has a first optical power applied to it. Such an optical power, for example, represents the degree by which a component of the optical path converges or diverges the light representative of the XR image. Further, a second component (e.g., the lightguide) of the optical path is configured to apply a second optical power to the light having the first optical power applied to it. For example, an element (incoupler, outcoupler, EPE) of the lightguide is configured to apply a second optical power to the defocused light provided by the light engine such that the light from the light engine has both the first and second optical powers applied to it. An outcoupler of the lightguide then provides the light with both the first and second optical powers applied to an eye of the user. Because the first and second optical powers are applied to the light before the light is provided to the user, the XR image represented by the light is displayed at a finite distance from the user (e.g., from the display system 100). For example, the XR image is displayed at a finite distance from the user based on the sum of the first and second optical powers.

Figure 2:
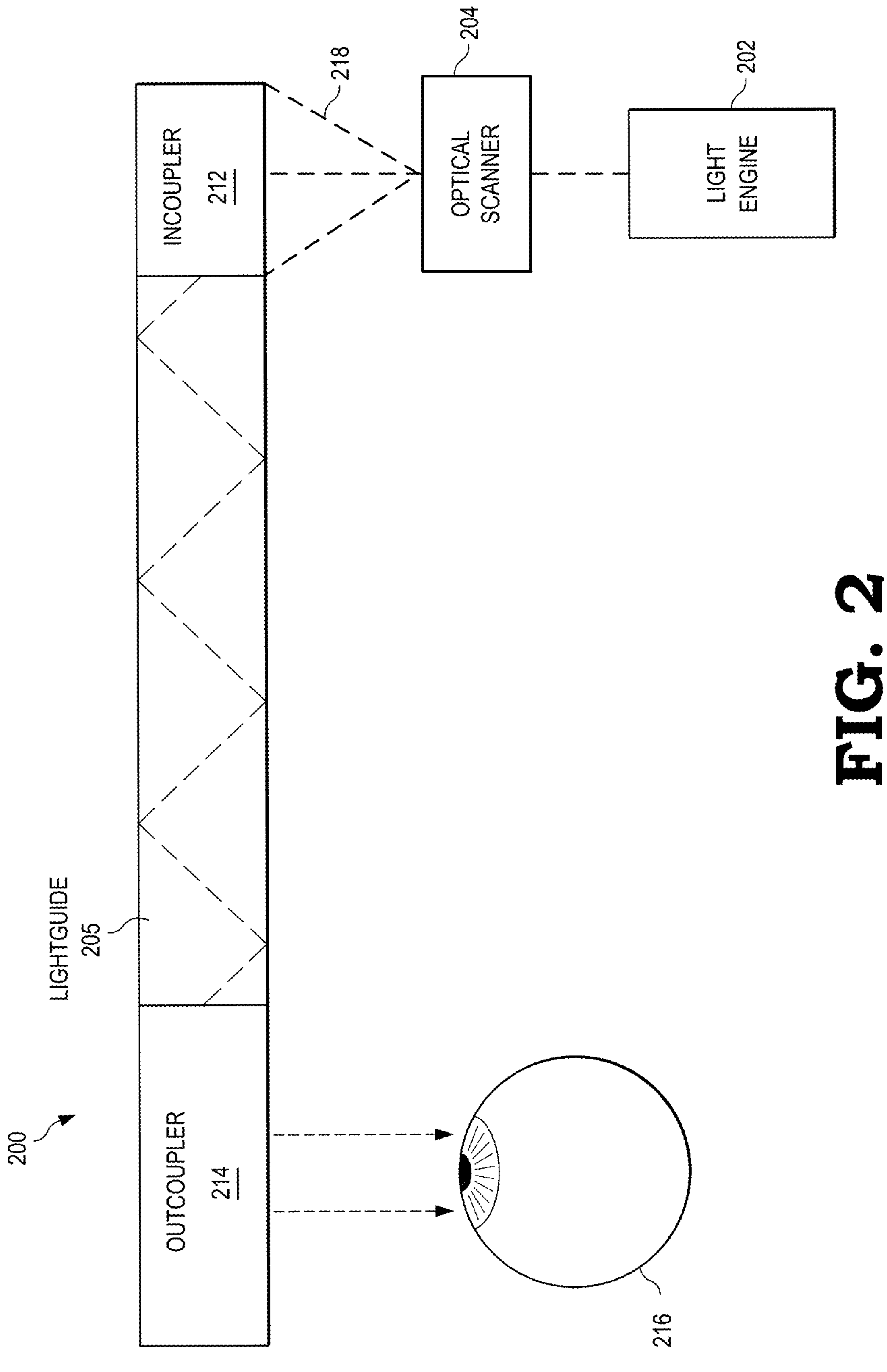
FIG. 2 is a diagram illustrating a projection system that projects images directly onto the eye of a user such that the images are presented at a predetermined finite distance, in accordance with some embodiments.

FIG. 2 illustrates a simplified block diagram of a projection system 200 that projects XR images directly onto the eye of a user via light such that the images are presented at a predetermined finite distance from the user, in accordance with embodiments. The projection system 200 includes a light engine 202 and a lightguide 205. The lightguide 205 includes an incoupler 212 and an outcoupler 214, with the outcoupler 214 being optically aligned with an eye 216 of a user in the present example. In some embodiments, the projection system 200 is implemented in an HWD, such as the display system 100 of FIG. 1.

The light engine 202 includes one or more light sources configured to generate and output light 218 (e.g., visible laser light such as red, blue, and green laser light and/or non-visible laser light such as infrared laser light) representative of an XR image. In some embodiments, the light engine 202 is coupled to a driver or other controller (not shown), which controls the timing of emission of light from the light sources of the light engine 202 in accordance with instructions received by the controller or driver from a computer processor coupled thereto to modulate the light 218 to be perceived as images when output to the retina of an eye 216 of a user. For example, during the operation of the projection system 200, multiple laser light beams having respectively different wavelengths are output by the light sources of the light engine 202, then combined via a beam combiner (not shown), before being directed to the eye 216 of the user. The light engine 202 modulates the respective intensities of the light beams so that the combined light reflects a series of pixels of an XR image, with the particular intensity of each light beam at any given point in time contributing to the amount of corresponding color content and brightness in the pixel being represented by the combined light at that time. According to embodiments, light engine 202 is configured to apply an optical power to the light 218. For example, light engine 202 is configured to defocus light 218 such that the light 218 received by the lightguide 205 has a first optical power applied.

In embodiments, the lightguide 205 of the projection system 200 includes the incoupler 212 and the outcoupler 214. The term "lightguide," as used herein, will be understood to mean a combiner using one or more of TIR, PIR, specialized filters, and/or reflective surfaces, to transfer light from an incoupler (such as the incoupler 212) to an outcoupler (such as the outcoupler 214). In general, the terms "incoupler" and "outcoupler" will be understood to refer to a set of any type of optical structures, including, but not limited to, diffraction grating structures, reflectors, mirrors, holograms, holographic optical elements (e.g., optical elements using one or more holograms), volume diffraction grating structures, volume holograms, surface relief diffraction grating structures, surface relief holograms, or any combination thereof. In some embodiments, a given incoupler or outcoupler is configured as a set of transmissive grating structures (e.g., transmissive diffraction grating structures or transmissive holographic grating structures) that causes the incoupler or outcoupler to transmit light and to apply designed optical function(s) to the light during the transmission. In some embodiments, a given incoupler or outcoupler is a set of reflective grating structures (e.g., reflective diffraction grating structures or reflective holographic grating structures) that causes the incoupler or outcoupler to reflect light and to apply designed optical function(s) to the light during the reflection.

In the present example presented in FIG. 2, the display light 218 received at the incoupler 212 is relayed to the outcoupler 214 via the lightguide 205 using TIR, PIR, or both. The display light 218 is then output to the eye 216 of a user via the outcoupler 214. In embodiments, one or more elements (e.g., incoupler 212, outcoupler 214, EPE) of the lightguide 205 are configured to apply an optical power to the light 218 provided from light engine 202. For example, the incoupler 212 of the lightguide 205 includes a set of gratings (e.g., transmissive gratings, reflective gratings) configured to apply a first optical power to received light. In this way, the light 218 provided by light engine 202 has an optical power applied to it as the light 218 propagates through the lightguide 205. As described above, in some embodiments the lightguide 205 is implemented as part of an eyeglass lens, such as the lens element 108 or lens element 110 (e.g., FIG. 1) of the display system having an eyeglass form factor and employing the projection system 200.

According to some embodiments, light engine 202 is configured to directly provide light 218 to the incoupler 212 of the lightguide 205 while in other embodiments, light engine 202 first provides light 218 to an optical scanner 204. The optical scanner 204 is configured to receive light 218 and scan light 218 in one or more directions toward incoupler 212 of lightguide 205. To this end, the optical scanner 204 includes one or more scan mirrors (e.g., MEMS mirrors) configured to scan received light in one or more directions (e.g., about one or more axes) and one or more optics relays configured to relay received light to a second point (e.g., incoupler 212). As an example, optical scanner 204 includes one or more MEMS mirrors that are driven by respective actuation voltages to oscillate in one or more directions (e.g., about one or more axes) during active operation of the projection system 200, causing the MEMS mirrors to scan the light 218 in one or more directions. Additionally, the optical scanner 204 includes one or more optical relays each including lenses, reflectors, or both configured to relay scanned light from a first scan mirror to a second scan mirror, relay scanned light from a scan mirror to incoupler 212, or both. For example, an optical relay includes a reflective relay, 2F relay, 4F relay, or any combination thereof configured to relay scanned light from a first scan mirror to a second scan mirror, incoupler 212, or both. In embodiments, an optical relay of the optical scanner 204 includes a line-scan relay configured to, for example, receive light scanned in one or more directions from a first scan mirror and relay the scanned light to a second scan mirror, the incoupler 212, or both such that the scanned light converges in the one or more directions to an exit pupil beyond the second scan mirror, the incoupler 212, or both. An exit pupil, for example, refers to the location along the optical path where beams of light intersect. According to embodiments, the width (e.g., smallest dimension) of a given exit pupil approximately corresponds to the diameter of the light 218 corresponding to that exit pupil.

In some embodiments, the light engine 202 includes an edge-emitting laser (EEL) that emits a light 218 having a substantially elliptical, non-circular cross-section, and the optical scanner includes 204 includes an optical relay configured to magnify or minimize the light 218 along its semi-major or semi-minor axis to circularize the light 218 prior to convergence of the light 218 on a scan mirror, incoupler 212, or both. In some such embodiments, a surface of a mirror plate of a scan mirror is elliptical and non-circular (e.g., similar in shape and size to the cross-sectional area of the light 218). In other such embodiments, the surface of the mirror plate of the scan mirror is circular.

Although not shown in the example of FIG. 2, in some embodiments, additional optical components are included in any of the optical paths between the light engine 202 and the optical scanner 204, between the optical scanner 204 and the incoupler 212, between the incoupler 212 and the outcoupler 214, between the outcoupler 214 and the eye 216 (e.g., in order to shape the display light for viewing by the eye 216 of the user), or any combination thereof. In some embodiments, a prism is used to steer display light from the optical scanner 204 into the incoupler 212 so that display light is coupled into incoupler 212 at the appropriate angle to encourage the propagation of the display light in lightguide 205 by TIR. Also, in some embodiments, an exit pupil expander (EPE) (e.g., EPE 324 of FIG. 3, described below), such as a set of fold grating structures, is arranged in an intermediate stage between incoupler 212 and outcoupler 214 to receive display light that is coupled into lightguide 205 by the incoupler 212, expand the display light, and redirect the display light towards the outcoupler 214, where the outcoupler 214 then couples the display light out of lightguide 205 (e.g., toward the eye 216 of the user).

Figure 3:
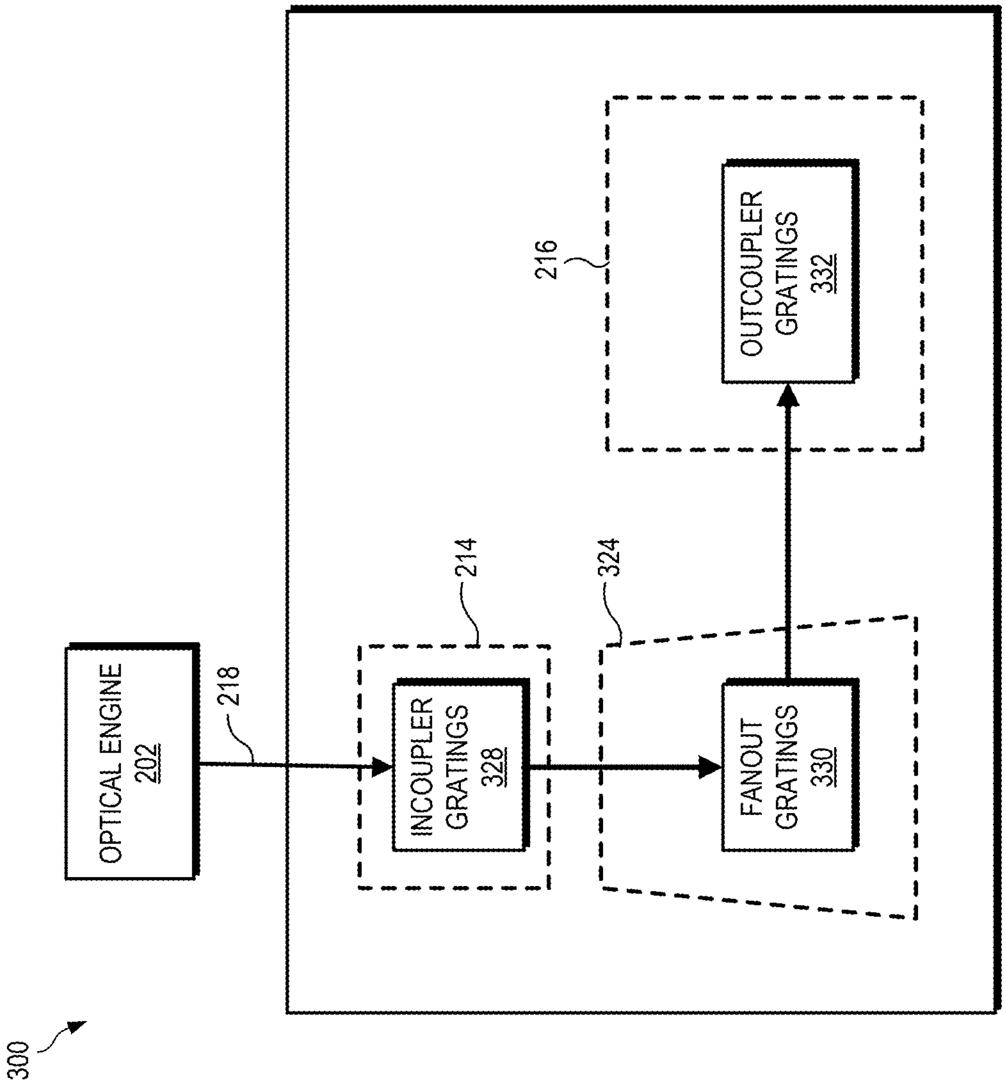
FIG. 3 is a diagram illustrating an example lightguide exit pupil expansion system, in accordance with embodiments.

FIG. 3 illustrates a lightguide exit pupil expansion system 300, according to embodiments. In embodiments, lightguide exit pupil expansion system 300 is implemented in, for example, display system 100 and is configured to provide an XR image to an eye 216 of a user an HWD. To this end, lightguide exit pupil expansion system 300 includes light engine 202 and lightguide 205. According to embodiments, light engine 202 is configured to project light 218 (e.g., white light, green light, red light, blue light, infrared light, ultraviolet light, or any combination thereof) towards incoupler 212 of lightguide 205.

After receiving light 218, incoupler 212 is configured to guide light 218 from incoupler 212 to exit pupil expander (EPE) 324 via at least a portion of lightguide 205. For example, incoupler 212 guides light 218 from incoupler 212 such that light 218 propagates through at least a portion of lightguide 205 via TIR, PIR, or both and is received at EPE 324. To this end, incoupler 212 includes one or more incoupler gratings 328 each configured to diffract or reflect light 218 in one or more directions into a portion of lightguide 205. Such incoupler gratings 328, for example, include one or more grating structures (e.g., Bragg grating structures, surface-relief grating structures, polarization volume grating structures, volumetric holographic grating structures, mirrors, facets, mirror coatings) disposed on a surface of or within lightguide 205 and are configured to diffract or reflect received light based on the angle of the grating structures, the material of the grating structures, or both into at least a portion of lightguide 205. In response to receiving light 218 from incoupler 212 (e.g., via at least a portion of lightguide 205), EPE 324 is configured to expand the eyebox of the display represented by light 218. For example, EPE 324 is configured to diffract or reflect light 218 such that the exit pupil of light 218 is enlarged (e.g., expanded).

To expand the exit pupil of light 218, EPE 324 includes one or more fanout gratings 330 that are configured to diffract or reflect received light so as to increase the size of the exit pupil of the light (e.g., expand the exit pupil of the light). Such fanout gratings 330, for example, include one or more grating structures (e.g., Bragg grating structures, surface-relief grating structures, polarization volume grating structures, volumetric holographic grating structures, mirrors, facets, mirror coatings) configured to diffract or reflect light received according to the angle of the grating structures, the material of the grating structures, or both such that the exit pupil of the light is expanded. According to embodiments, EPE 324 provides light 218 with the expanded exit pupil to at least a second portion of lightguide 205 configured to propagate light 218 (e.g., via TIR, PIR) toward outcoupler 214. For example, fanout gratings 330 are configured to diffract or reflect received light 218 such that the exit pupil of light 218 is expanded and light 218 is provided to outcoupler 214 via at least a second portion of lightguide 205. Outcoupler 214 is configured to direct received light 218 out of lightguide 205 and towards the eye 216 of a user. To this end, outcoupler 214 includes one or more outcoupler gratings 332 configured to diffract or reflect received light 218 out of lightguide 205. Outcoupler gratings 332 includes, for example, one or more grating structures (e.g., Bragg grating structures, surface-relief grating structures, polarization volume grating structures, volumetric holographic grating structures, mirrors, facets, mirror coatings) configured to diffract or reflect light based on the angle of the grating structures, the material of the grating structures, or both such that the light is directed out of lightguide 205 and toward the eye 216 of a user.

Figure 4:
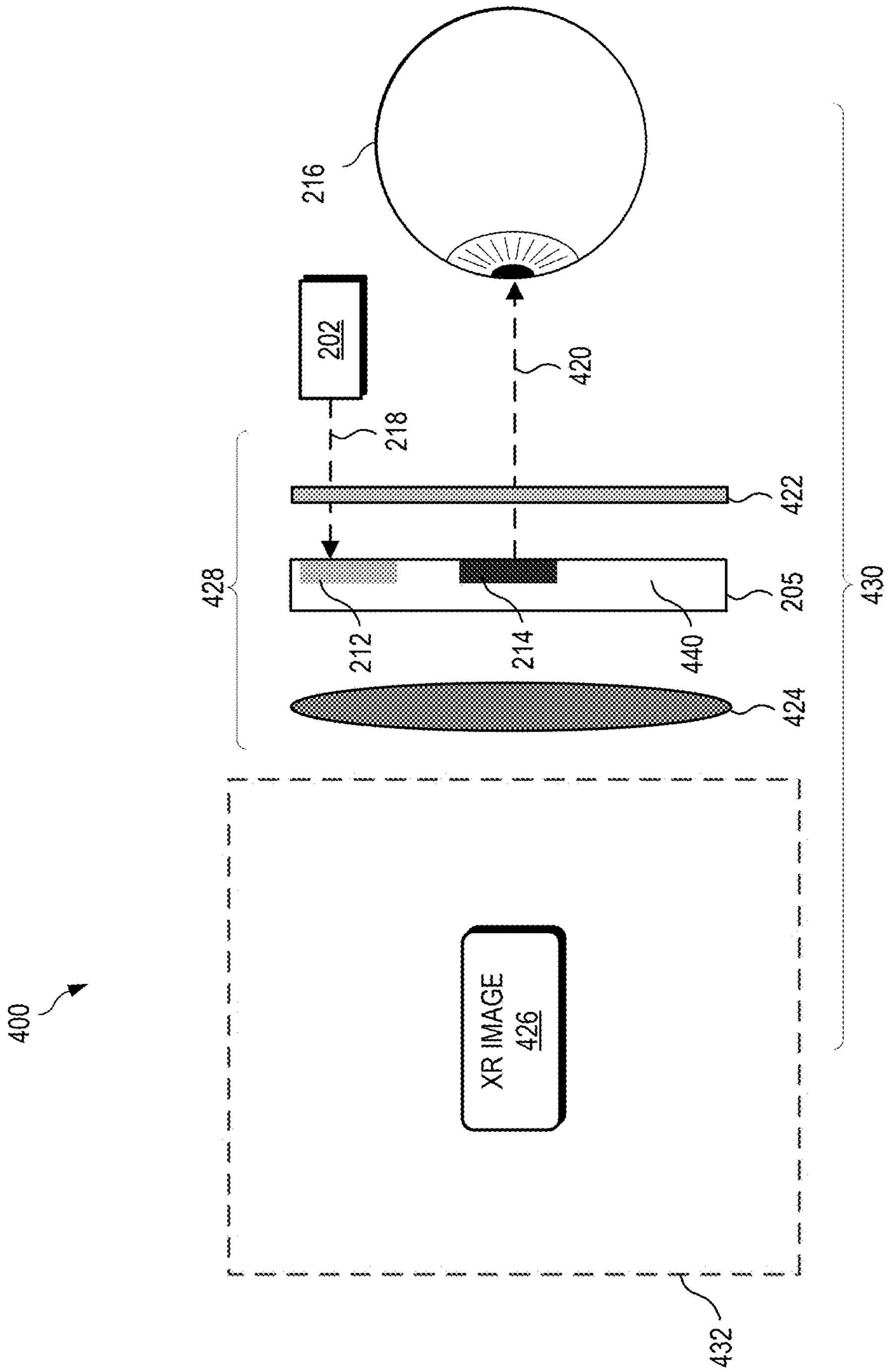
FIG. 4 is a diagram of an optical path configured to display an extended reality (XR) image at an infinite distance, in accordance with some embodiments.

Referring now to FIG. 4, an optical path 400 configured to display an XR image at an infinite distance is presented, in accordance with embodiments. According to embodiments, optical path 400 is implemented within projection system 200. In embodiments, optical path 400 includes a light engine 202 and an optical combiner 428. The optical combiner 428, for example, includes a lens 424, a protective layer 422, and a lightguide 205. Such a protective layer 422 for example, includes an effectively transparent material (e.g., plastic, glass) that allows for light 218, ambient light from real world 432, or both to pass through. Further, the protective layer 422 is configured to protect the components of the optical combiner 428 (e.g., the lightguide 205) from dirt, dust, oil, fingers, water, or any combination thereof, to name a few. The lens 424, in embodiments, is disposed at a world-facing side of the optical combiner 428 (e.g., the side facing away from the user) and also includes an effectively transparent material (e.g., plastic, glass) that allows for ambient light from real world 432 to pass through. In embodiments the protective layer 422 and the lens 424 are made from the same material while in other embodiments, the protective layer 422 and the lens 424 are made from different materials. Further, according to embodiments, the lightguide 205 is disposed between the lens 424 and the protective layer 422 such that the lightguide 205 is protected against potentially damaging conditions (e.g., dirt, dust, oil, fingers, water).

Within optical path 400, the light engine 202 is configured to provide light 218 to the incoupler 212 of the lightguide 205 in optical combiner 428. In some embodiments, light engine 202 is configured to directly provide light 218 to the optical combiner 428 such that the light 218 is emitted by light engine 202, passes through the protective layer 422, and is then received by the incoupler 212. In other embodiments, light engine 202 is configured to first provide light 218 to an optical scanner 204 (not pictured for clarity) which, in turn, provides light 218 to the optical combiner 428. Additionally, according to embodiments, the lightguide 205 of the optical combiner 428 includes a single layer. That is to say, lightguide 205 includes a single-layer lightguide configured to receive, for example, each wavelength of light 218 emitted by light engine 202. In embodiments, light engine 202 is configured to project light 218 as collimated light. Such collimated light, for example, includes light having effectively parallel rays such that light 218 has minimal spread as it propagates. In response to receiving the collimated light 218 from light engine 202, the incoupler 212 directs the collimated light 218 into the body 440 of the lightguide 205 such that the collimated light 218 propagates through the lightguide 205 via PIR, TIR, or both. As an example, in response to receiving the collimated light 218 from light engine 202, a set of incoupler gratings 328 of the incoupler 212 diffracts or reflects the collimated light 218 into the lightguide 205 such that the collimated light 218 propagates through the lightguide 205 via TIR, PIR, or both.

According to embodiments, the collimated light 218 continues to propagate through the lightguide 205 until the collimated light 218 is received by the outcoupler 214. In some embodiments, the collimated light 218 is first received by an EPE (e.g., EPE 324) of the lightguide 205 before being received by the outcoupler 214. Based on receiving the collimated light 218, the outcoupler 214 directs the collimated light 218 out the user-facing side of the optical combiner 428 and toward the eye 216 of the user as display light 420. For example, in response to receiving the collimated light 218, a set of outcoupler gratings 332 of the outcoupler 214 diffracts or reflects the collimated light 218 out of a surface of the lightguide 205 such that display light 420 passes through the protective layer 422 and travels toward the eye 216 of a user. As the display light 420 travels toward the eye 216 of the user, the display light 420 forms an exit pupil representing an XR image 426 that is presented to the user in the real world 432 at a distance 430 away from the user. However, because the display light 420 forming the exit pupil representing the XR image 426 was collimated as it propagated through the lightguide 205, the XR image 426 is presented at an infinite distance. That is to say, the XR image 426 is presented at a distance 430 of infinity. Due to the XR image 426 being presented at an infinite distance, the eye 216 of the user is required to switch focus when looking between the real world 432 and the XR image 426, potentially inducing eye fatigue, headaches, nausea, or any combination thereof in the user and negatively impacting user experience.

Figure 5:
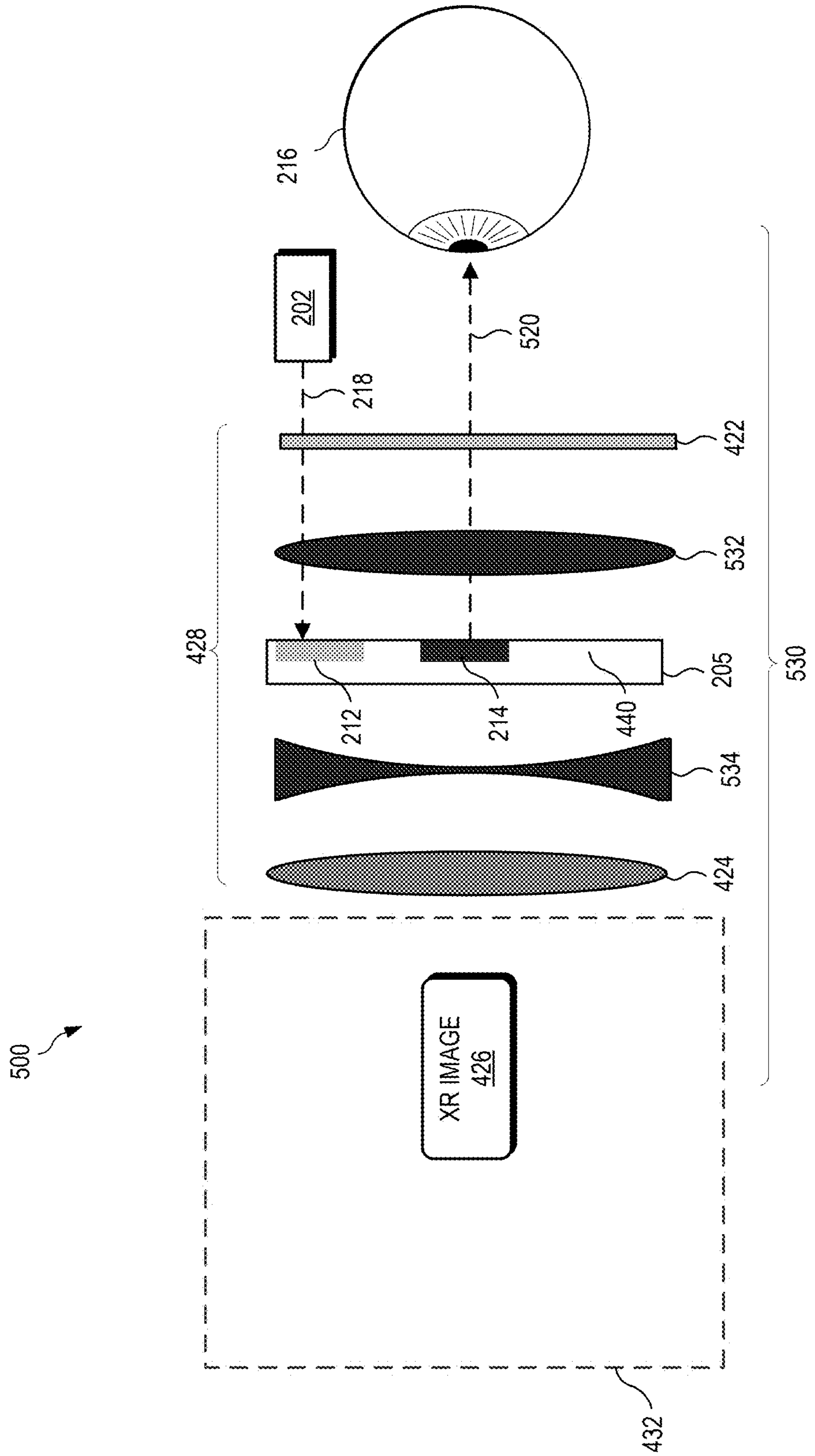
FIG. 5 is a diagram of an optical path including a push and pull lens combination, in accordance with some embodiments.

To help reduce the likelihood of inducing eye fatigue, headaches, nausea, or any combination thereof in the user, some optical paths include one or more push and pull lens pairs. For example, FIG. 5 presents an optical path 500 including a push and pull lens combination and configured to display an XR image at a finite distance from a user, in accordance with embodiments. According to embodiments, optical path 500 is implemented within projection system 200. In embodiments, optical path 500 includes a light engine 202 and an optical combiner 428 having a lens 424, a push lens 534, a lightguide 205, a pull lens 532, and a protective layer 422. In embodiments, the optical combiner 428 is arranged such that the lens 424 forms a world-facing side of the optical combiner 428 and the protective layer forms a user-facing side of the optical combiner 428. Further, the push lens 534 is disposed at the world-face side of the optical combiner 428 and the pull lens 532 is disposed at the user-facing side of the optical combiner 428. Additionally, within the optical combiner 428, the lightguide 205 is disposed between the push lens 534 and the pull lens 532.

Within the optical path 500, in some embodiments, light engine 202 is configured to directly provide light 218 to the optical combiner 428 (e.g., to protective layer 422) while in other embodiments light engine 202 is configured to provide light 218 to the optical combiner 428 via an optical scanner 204 (not shown for clarity). Additionally, within optical path 500, light 218 from light engine 202 passes through protective layer 422 and pull lens 532 before being received by the incoupler 212. In embodiments, pull lens 532 comprises a lens (e.g., concave lens) configured to apply an optical power to light 218. This optical power (e.g., in diopters), for example, represents the degree by which the push lens 532 converges or diverges the light representative of the XR image 426. As an example, in embodiments, pull lens 532 is configured to apply a first optical power to light 218 as light 218 passes through push lens 532. After light 218 passes through the pull lens 532, the light 218 with the first optical power applied is received by the incoupler 212 of the lightguide 205. The incoupler 212 then directs the light 218 with the first optical power applied into the lightguide 205 such that the light 218 with the first optical power applied propagates through the lightguide 205 and is received at the outcoupler 214. In some embodiments, the light 218 with the first optical power applied propagating through the lightguide 205 is first received by an EPE (e.g., EPE 324) of the lightguide 205 before being received by the outcoupler 214.

In response to receiving the light 218 with the first optical power applied, the outcoupler 214 directs the light 218 with the first optical power applied out of the lightguide 205 toward the eye 216 of the user as display light 520. For example, the outcoupler 214 directs the light 218 out of the lightguide 205 as display light 520 that passes through the pull lens 532 and protective layer 422 before forming an exit pupil near the eye 216 of the user that presents XR image 426 to the user. In embodiments, as the display light 520 passes through the pull lens 532, the pull lens 532 is configured to apply the first optical power to the display light 520. Due to the optical power applied to the light 218 (e.g., from light engine 202), display light 420, or both by pull lens 532, XR image 426 is presented at a predetermined finite distance 530 from the user. That is to say, based on the pull lens 532 applying an optical power to the light 218 from the light engine 202, the display light 520, or both, the XR image 426 is pulled in from an infinite display distance such that the XR image 426 is presented at a finite distance from the user based on the optical power applied to the light 218 from the light engine 202, the display light 520, or both by the pull lens 532.

However, in embodiments, the pull lens 532 also applies an optical power (e.g., first optical power) to ambient light from the real world 432. Due to the pull lens 532 applying an optical power to the ambient light from the real world 432, the user's view of the real world 432 is modified. For example, the user's view of the real world 432 is pulled closer to the user based on the optical power applied to the ambient light from the real world 432 by the pull lens 532. As such, to help prevent the pull lens 532 from modifying a user's view of the real world 432, optical combiner 428 include push lens 534. Push lens 534 includes a lens (e.g., convex lens) configured to apply an optical power to the ambient light from the real world 432. For example, push lens 534 is configured to apply a second optical power to the ambient light from the real world 432 so as to mitigate a first optical power applied by the pull lens 532 to the ambient light from the real world 432. That is to say, the second optical power applied by the push lens 534 to the ambient light from the real world 432 reduces the first optical power applied by the pull lens 532 to the ambient light from the real world 432. Because the push lens 534 mitigates any optical power applied to the ambient light from the real world 432 by pull lens 532, the push lens 534 allows a user to view the real world 432 through the optical combiner 428 without modification. However, including a push and pull lens combination in the optical combiner 428 increases the thickness and weight of the optical combiner 428. This increases the thickness and weight of the optical combiner 428 which, in turn, increases the thickness and weight of an HWD including such an optical combiner 428, negatively impacting user experience.

Figure 6:
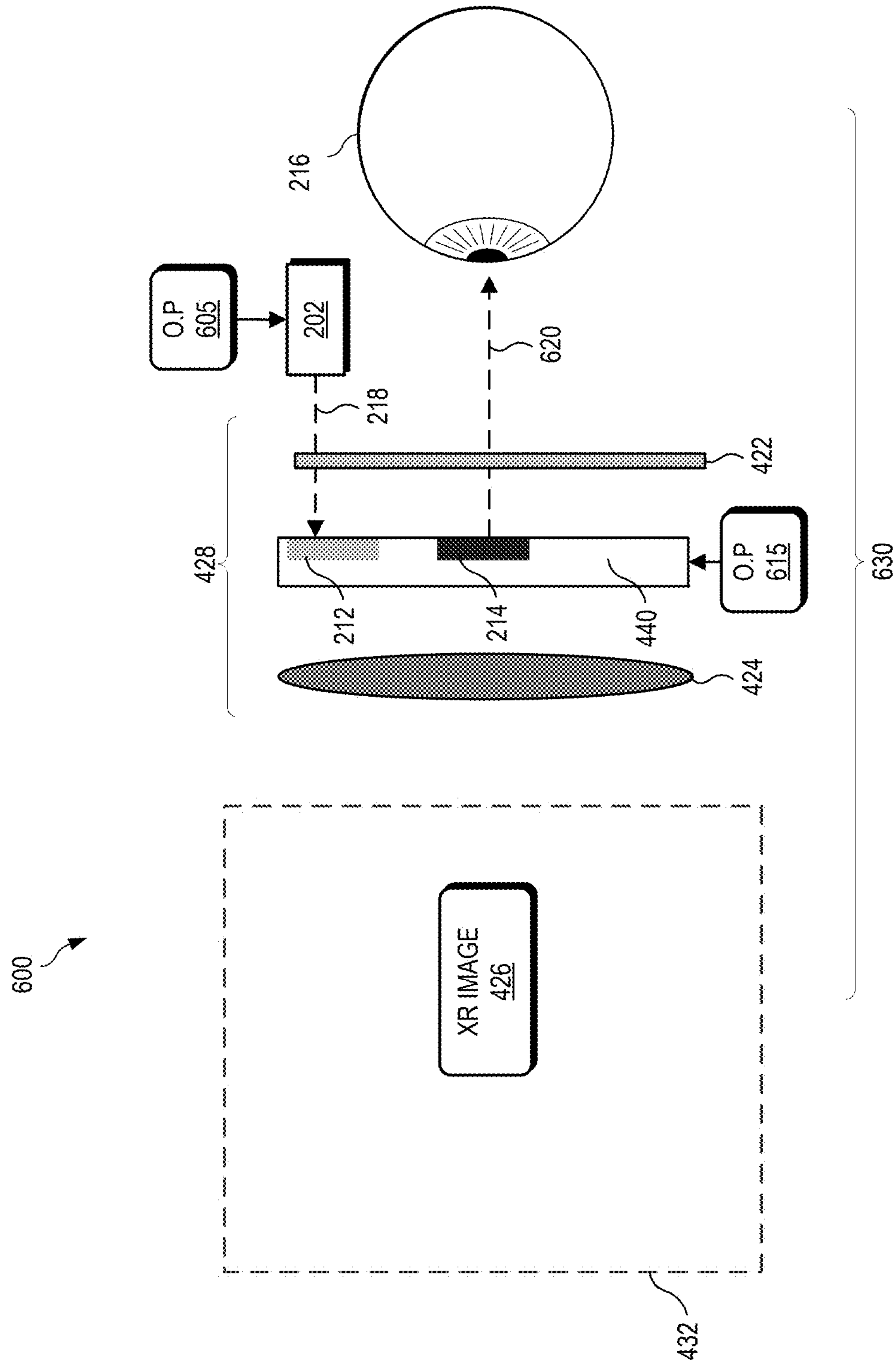
FIG. 6 is a diagram of an optical path including two or more components configured to apply an optical power to light representing an image, in accordance with some embodiments.

To this end, FIG. 6 presents an optical path 600 including two or more components configured to apply an optical power to light presented to a user, in accordance with some embodiments. Optical path 600, for example, includes two or more components configured to apply an optical power to light 218 from a light engine 202 such that an XR image 426 represented by the light 218 is presented at a predetermined finite distance 630 from a user. According to embodiments, optical path 500 is implemented within projection system 200.

To apply an optical power to light 218 from a light engine 202, optical path 600 includes light engine 202 and optical combiner 428 having a lens 424, lightguide 205, and a protective layer 422. In embodiments, within the optical path 600, a first component (e.g., light engine 202, protective layer 422, lightguide 205, lens 424) is configured to apply a first optical power 605 to the light 218 representing XR image 426 emitted from light engine 202. For example, the light engine 202 is configured to defocus light 218 such that light 218 has a first optical power 605 applied when the light engine 202 emits the light 218 toward the lightguide 205. The first optical power 605, for example, represents the degree (e.g., in diopters) by which the first component of the optical path 600 converges or diverges the light 218 representative of the XR image 426. According to some embodiments, within optical path 600, light engine 202 is configured to directly provide light 218 with the first optical power 605 applied to the optical combiner 428 while in other embodiments, light engine 202 is configured to provide light 218 with the first optical power 605 applied to an optical scanner 204 (e.g., not pictured for clarity).

Additionally, in embodiments, optical path 600 includes a second component (e.g., light engine 202, protective layer 422, lightguide 205, lens 424) configured to apply a second optical power 615 to light 218 with the first optical power 605 applied. As an example, in embodiments, the lightguide 205 is configured to apply a second optical power 615 to the light 218 with the first optical power 605. To this end, the light engine 202 emits light 218 with the first optical power 605 applied to optical combiner 428. The light 218 with the first optical power 605 then passes through the protective layer 422 and is received by the incoupler 212 of the lightguide 205. After the light 218 with the first optical power 605 is received by the incoupler 212, one or more elements of the lightguide 205 (e.g., the incoupler 212, an EPE, the main body 440, the outcoupler 214) are configured to apply the second optical power 615 to the light 218 with the first optical power 605. As an example, the incoupler 212 of the lightguide 205 is configured to apply the second optical power 615 to the light 218 with the first optical power 605 as the incoupler 212 directs the light 218 with the first optical power 605 into the lightguide 205. As another example, the outcoupler 214 of the lightguide 205 is configured to apply the second optical power 615 to the light 218 with the first optical power 605 as the outcoupler 214 directs the light 218 with the first optical power 605 out of the lightguide 205 as display light 620. As yet another example, the body 440 of the lightguide 205 is configured to apply the second optical power 615 to the light 218 with the first optical power 605 as the light 218 with the first optical power 605 propagates through the body 440 of the lightguide 205.

According to embodiments, after the first component of the optical path 600 has applied the first optical power 605 and the second component of the optical path 600 has applied the second optical power 615 to the light 218, the light 218 has a total optical power applied equal to a sum of the first optical power 605 and the second optical power 615. Further, after the first component of the optical path 600 has applied the first optical power 605 and the second component of the optical path 600 has applied the second optical power 615 to the light 218, the outcoupler 214 of the lightguide 205 is configured to direct the light 218 with the total optical power applied (e.g., the sum of the first optical power 605 and the second optical power 615) out of the lightguide 205 toward the eye 216 of a user as display light 620. Display light 620 then forms an exit pupil near the eye 216 of the user that allows the user to view the XR image 426 in the real world 432. Because the first optical power 605 and second optical power 615 were applied to the display light 620 (e.g., light 218) before being provided to the eye 216 of the user, the XR image 426 is presented at a predetermined finite distance 630 from an HWD incorporating the optical path 600 (e.g., from the user) based on the first optical power 605 and the second optical power 615. For example, the finite distance 630 is based on a sum of the first optical power 605 and the second optical power 615. In some embodiments, the first optical power 605 and the second optical power 615 are equal in value while in other embodiments the first optical power 605 and the second optical power 615 differ in value. Further, according to some embodiments, the first optical power 605 and the second optical power 615 are both positive values or the first optical power 605 and the second optical power 615 are both negative values.

In this way, the optical path 600 is configured to present XR images 426 to a user at a finite distance 630 from an HWD incorporating the optical path 600 (e.g., from the user) rather than an infinite distance, helping reduce the likelihood of inducing eye fatigue, headaches, or nausea in the user and improving user experience. Additionally, because the optical powers 605, 615 are applied by components (e.g., light engine 202, a protective layer 422, lightguide 205, lens 424) within the optical path 600, additional components such a pull lens 532 and push lens 534 are not required, helping reduce the thickness and weight of the HWD incorporating the optical path 600 when compared to HWDs including such additional components. Further, because the application of optical powers 605, 615 is split between two or more components of the optical path 600 rather than having a single component apply the optical powers 605, 615, the XR image 426 is presented to the user at a finite distance 630 without reducing the quality of the XR image 426. For example, defocusing the light engine 202 to provide both the first and second optical powers 605, 615 increases the likelihood that the lightguide 205 (e.g., via pupil replication) noticeably degrades the XR image 426 presented to the user. However, splitting the between two or more components of the optical path 600 reduces the optical power 605 that the light engine 202 needs to apply, helping to decrease the likelihood that lightguide 205 noticeably degrades the XR image 426 presented to the user.

According to some embodiments, lens 424, protective layer 422, or both are configured to apply an optical power to light 218, ambient light from the real world 432, or both. As an example, in some embodiments, the lens 424 includes opposite non-planar surfaces resembling, for example, the lens of an eyeglass. Due to the opposite non-planar surfaces of the lens 424, the lens 424 is configured to apply an optical power to the ambient light received from real world 432, modifying the user's view of the real world 432. As another example, in some embodiments, the protective layer 422 includes a material (e.g., plastic, glass) configured to apply an optical power to light 218, display light 620, ambient light from real world 432, or any combination thereof as they pass through the protective layer 422. Applying such an optical power to light 218, display light 620, ambient light from real world 432, or any combination thereof causes the user's view of the XR image 426, real world 432, or both to be modified. As such, to help mitigate these modifications to the user's view of the XR image 426, real world 432, or both, in embodiments, optical path 600 is configured to also apply an optical power 605, 615 to light 218 so as to mitigate any optical power applied by lens 424, protective layer 422, or both. That is to say, the optical path 600 includes a first component (e.g., light engine 202, protective layer 422, lightguide 205, lens 424) configured to apply the first optical power 605 and a second component (e.g., light engine 202, protective layer 422, lightguide 205, lens 424) configured to apply the second optical power 615 such that the XR image 426 is displayed at a predetermined finite distance 630 from an HWD incorporating the optical path 600 (e.g., from the user) and any optical power applied by lens 424, protective layer 422, or both to ambient light from the real world 432, light 218, display light 620, or any combination thereof is reduced. As an example, within optical path 600, the light engine 202 is configured to apply a first optical power 605 to the light 218 and the lightguide 205 is configured to apply a second optical power 615 to the light 218 having the first optical power 605 applied such that a resulting XR image 426 is presented at a predetermined finite distance 630 from the user and any optical power applied by lens 424, protective layer 422, or both to ambient light from the real world 432, light 218, display light 620, or any combination thereof is reduced.

Figure 7:
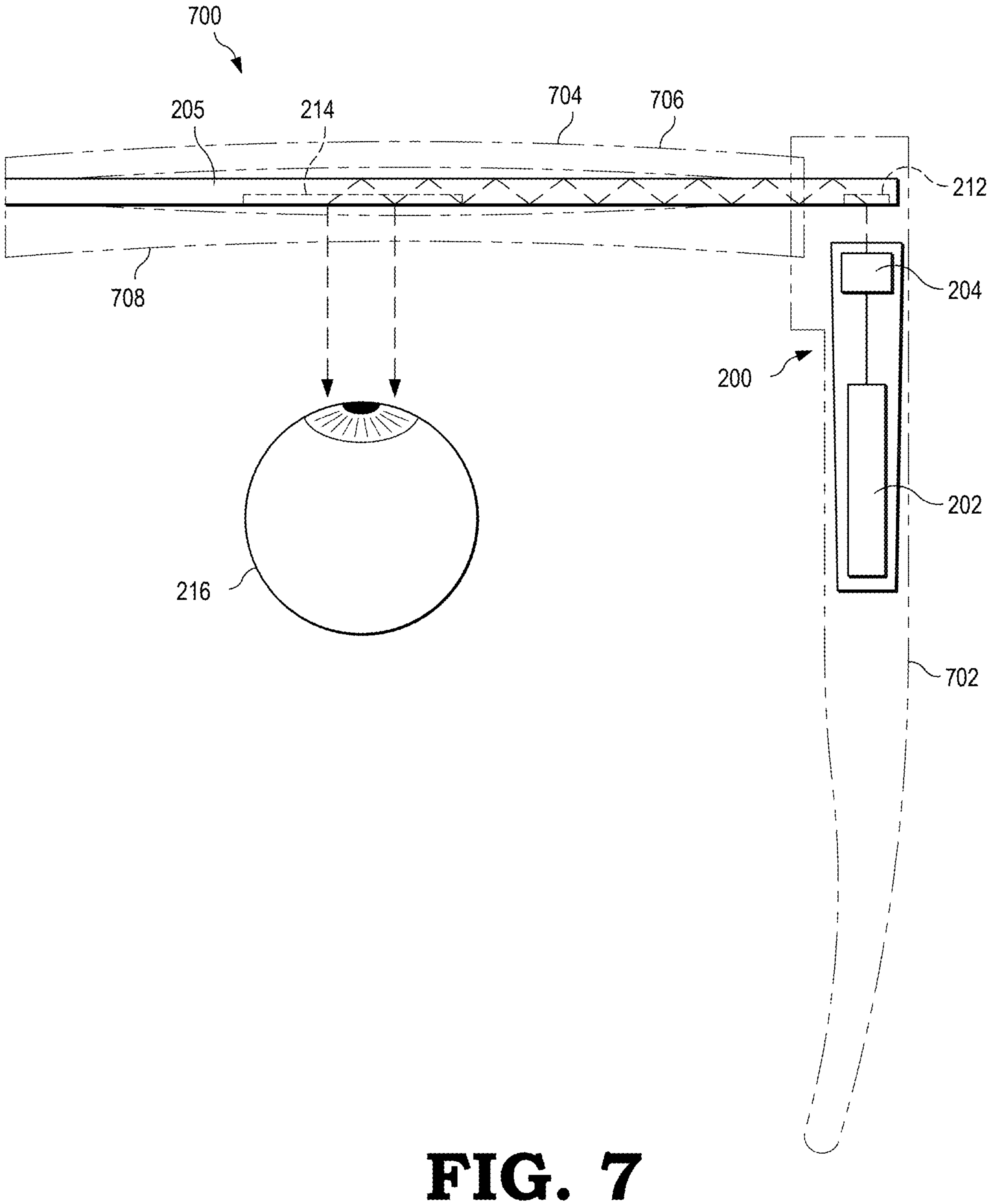
FIG. 7 is a diagram illustrating a partially transparent view of a head-worn display (HWD) that includes a projection system, in accordance with some embodiments

FIG. 7 illustrates a portion of an HWD 700 that includes an optical path configured to present an XR image to a user at a predetermined finite distance, in accordance with some embodiments. For example, according to embodiments, HWD 700 includes optical path 600. In some embodiments, the HWD 700 represents the display system 100 of FIG. 1. The light engine 202, optical scanner 204, and a portion of the lightguide 205 with incoupler 212 are included in an arm 702 of the HWD 700, in the present example.

The HWD 700 includes an optical combiner lens 704 which includes a first lens 706, a second lens 708, and the lightguide 205, with the lightguide 205 disposed between the first lens 706 and the second lens 708. Light 218 exiting through the outcoupler 214 travels through the second lens 708 (which corresponds to, for example, the lens element 110 of the display system 100). In use, the laser light exiting second lens 708 enters the pupil of an eye 216 of a user wearing the HWD 700, causing the user to perceive a displayed XR image carried by the light 218 output by the light engine 202.

According to embodiments, the optical combiner lens 704 is substantially transparent, such that light from real-world scenes corresponding to the environment around the HWD 700 passes through the first lens 706, the second lens 708, and the lightguide 205 to the eye 216 of the user. In this way, images, or other graphical content output by the projection system 200 are combined (e.g., overlayed) with real-world images of the user's environment when projected onto the eye 216 of the user to provide an AR experience to the user.

Although not shown in the depicted example, in some embodiments additional optical elements are included in any of the optical paths between the light engine 202 and the incoupler 212, in between the incoupler 212 and the outcoupler 214, in between the outcoupler 214 and the eye 216 of the user (e.g., in order to shape the display light for viewing by the eye 216 of the user), or any combination thereof. As an example, a prism is used to steer light from the optical scanner 204 into the incoupler 212 so that light is coupled into incoupler 212 at the appropriate angle to encourage propagation of the light in lightguide 205 by TIR. Also, in some embodiments, one or more exit pupil expanders (e.g., the EPE 324) including, for example, fanout gratings 330 are arranged in an intermediate stage between incoupler 212 and outcoupler 214 to receive light that is coupled into lightguide 205 by the incoupler 212, expand the light, and redirect the light towards the outcoupler 214 where the outcoupler 214 then couples the display light out of the lightguide 205 (e.g., toward the eye 216 of the user).

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An optical path for a wearable display, the optical path including:

a light engine configured to emit light representing an image such that the light representing the image has a first optical power applied;

a lightguide including:

an element configured to apply a second optical power to the light representing the image with the first optical power applied; and an outcoupler configured to direct the light representing the image with the first and second optical powers applied such that the image is presented to a user of the wearable display at a finite distance from the wearable display based on the first optical power and the second optical power; and a protective layer disposed between the lightguide and the user, wherein the light engine is configured to apply the first optical power to the light representing the image so as to mitigate at least a portion of a third optical power applied by the protective layer to the light representing the image.

2. The optical path of claim 1, wherein the element comprises an incoupler of the lightguide.

3. The optical path of claim 1, wherein the element comprises the outcoupler of the lightguide.

4. The optical path of claim 1, wherein the light engine is configured to:

defocus the light representing the image such that the first optical power is applied to the light representing the image.

5. The optical path of claim 1, further including:

a lens having opposite non-planar surfaces, wherein the light engine is configured to apply the first optical power to the light representing the image so as to mitigate at least a portion of a fourth optical power applied by the lens to the light representing the image.

6. The optical path of claim 1, wherein the lightguide comprises a single-layer lightguide.

7. A method, comprising:

emitting, by a light engine of a wearable display, light representing an image such that the light representing the image has a first optical power applied;

applying, by a lightguide of the wearable display, a second optical power to the light representing the image with the first optical power applied;

applying, by a lens having opposite non-planar surfaces, a third optical power to the light representing the image, wherein the first optical power applied by the light engine mitigates at least a portion of the third optical power applied to the light representing the image; and presenting, to a user of the wearable display, the image to the user at a finite distance from the wearable display based on the first optical power and the second optical power.

8. The method of claim 7, wherein applying, by the lightguide of the wearable display, the second optical power to the light representing the image with the first optical power applied includes an exit pupil expander of the lightguide applying the second optical power.

9. The method of claim 7, wherein applying, by the lightguide of the wearable display, the second optical power to the light representing the image with the first optical power applied includes an outcoupler of the lightguide applying the second optical power.

10. The method of claim 7, further comprising:

defocusing, by the light engine, the light representing the image such that the first optical power is applied to the light representing the image.

11. The method of claim 7, wherein the lightguide comprises a single-layer lightguide.

12. The method of claim 7, further comprising:

applying, by a protective layer disposed between the lightguide and an eye of the user, a fourth optical power to the light representing the image; and applying, by the light engine, the first optical power to the light representing the image so as to mitigate at least a portion of the fourth optical power applied by the protective layer to the light representing the image.

13. A wearable display configured to present an image to a user, the wearable display comprising:

a light engine configured to emit light representing the image;

a first component of an optical path configured to apply a first optical power to the light representing the image;

a second component of the optical path configured to apply a second optical power to the light representing the image having the first optical power applied;

a lightguide configured to provide the light representing the image with the first optical power and the second optical power applied to the user such that the image is presented to the user at a finite distance from the wearable display based on the first optical power and the second optical power; and a protective layer disposed between the lightguide and the user, wherein the first component is configured to apply the first optical power to the light representing the image so as to mitigate at least a portion of a third optical power applied by the protective layer to the light representing the image.

14. The wearable display of claim 13, wherein the first component comprises the light engine.

15. The wearable display of claim 14, wherein the light engine is configured to defocus the light representing the image such that the first optical power is applied.

16. The wearable display of claim 13, wherein the second component comprises the lightguide.

17. The wearable display of claim 16, wherein the lightguide includes an incoupler configured to apply the second optical power to the light representing the image with the first optical power applied.

18. The wearable display of claim 13, wherein the lightguide comprises a single-layer lightguide.

19. The wearable display of claim 13, further comprising:

a lens having opposite non-planar surfaces, wherein the first component is configured to apply the first optical power to the light representing the image so as to mitigate at least a portion of a fourth optical power applied by the lens to the light representing the image.

20. The optical path of claim 1, further comprising a pull lens disposed between the user and the lightguide.

* * * * *